United States Patent
Lin et al.

(10) Patent No.: US 8,824,615 B2
(45) Date of Patent: Sep. 2, 2014

(54) FREQUENCY TRACING CIRCUIT AND METHOD THEREOF

(71) Applicant: National Taiwan University, Taipei (TW)

(72) Inventors: Tsung-Hsien Lin, Taoyuan County (TW); Cheng-En Liu, Taichung (TW); Chen-Chien Lin, Taoyuan County (TW); Wei-Hao Chiu, Taipei (TW); Sung-Lin Tsai, Yunlin County (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 13/803,476

(22) Filed: Mar. 14, 2013

(65) Prior Publication Data

US 2014/0152356 A1 Jun. 5, 2014

(30) Foreign Application Priority Data

Nov. 30, 2012 (TW) .............................. 101145010 A

(51) Int. Cl.
*H04L 7/04* (2006.01)
*H03L 7/06* (2006.01)

(52) U.S. Cl.
USPC ........... 375/373; 375/376; 327/147; 327/155; 713/400; 713/503

(58) Field of Classification Search
CPC ..... H04L 7/033; H04L 7/0331; H04L 7/0337; H04L 7/0338; H04L 27/148; H04L 27/152; H03L 7/08; H03L 7/0807; H03L 7/087; H03L 7/091; H03L 7/093; H03L 7/097; H03L 7/0991; H03L 7/0992; H03L 7/143; H03L 7/145; H03L 7/146; H03L 7/16; H03L 7/18
USPC ................. 375/326, 327, 328, 371, 373, 376; 327/146, 147, 149–151, 153, 155, 156, 327/158–161; 713/400, 401, 500–503, 600, 713/601

See application file for complete search history.

(56) References Cited

U.S. PATENT DOCUMENTS

| | | | | |
|---|---|---|---|---|
| 6,760,389 B1* | 7/2004 | Mukherjee et al. | ........... | 375/326 |
| 7,312,645 B1* | 12/2007 | Brunn | ........... | 327/147 |
| 2006/0255866 A1* | 11/2006 | Hirai | ........... | 331/45 |
| 2009/0086872 A1* | 4/2009 | Liu et al. | ........... | 375/371 |
| 2010/0289593 A1* | 11/2010 | Chen et al. | ........... | 331/177 R |

* cited by examiner

*Primary Examiner* — Young T. Tse
(74) *Attorney, Agent, or Firm* — Li & Cai Intellectual Property (USA) Office

(57) ABSTRACT

A frequency tracking circuit is disclosed. The frequency tracking circuit includes an edge selector, a phase-frequency processor and a digital controlled oscillator. The edge selector receives a data signal and feedback clock signal and sequentially outputs a data edge signal and a feedback-clock-edge signal. The phase-frequency processor receives the data edge signal and the feedback-clock-edge signal and outputs a frequency adjusting digital signal after executing differential operation according to a first phase difference and a second phase difference. The digital controlled oscillator receives the frequency adjusting digital signal so as to adjust frequency of the feedback clock signal. The phase-frequency processor outputs a frequency tracking signal to the edge selector, wherein the edge selector utilizes the frequency tracking signal for acquiring the data edge signal and utilizes the data edge signal for acquiring the feedback-clock-edge signal.

20 Claims, 10 Drawing Sheets

| d1 | d2 | d3 | d4 | d5 | d6 | d7 | d8 | d9 | d10 | d11 | d12 | d13 | d14 | d15 | PDS |
|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 0 0 0 0 |
| 1 | 1 | 1 | 1 | 1 | 1 | 1 | 1 | 1 | 1 | 1 | 1 | 1 | 1 | 0 | 0 0 0 1 |
| 1 | 1 | 1 | 1 | 1 | 1 | 1 | 1 | 1 | 1 | 1 | 1 | 1 | 0 | 0 | 0 0 1 0 |
| 1 | 1 | 1 | 1 | 1 | 1 | 1 | 1 | 1 | 1 | 1 | 1 | 0 | 0 | 0 | 0 0 1 1 |
| 1 | 1 | 1 | 1 | 1 | 1 | 1 | 1 | 1 | 1 | 1 | 0 | 0 | 0 | 0 | 0 1 0 0 |
| 1 | 1 | 1 | 1 | 1 | 1 | 1 | 1 | 1 | 1 | 0 | 0 | 0 | 0 | 0 | 0 1 0 1 |
| 1 | 1 | 1 | 1 | 1 | 1 | 1 | 1 | 1 | 0 | 0 | 0 | 0 | 0 | 0 | 0 1 1 0 |
| 1 | 1 | 1 | 1 | 1 | 1 | 1 | 1 | 0 | 0 | 0 | 0 | 0 | 0 | 0 | 0 1 1 1 |
| 1 | 1 | 1 | 1 | 1 | 1 | 1 | 0 | 0 | 0 | 0 | 0 | 0 | 0 | 0 | 1 0 0 0 |
| 1 | 1 | 1 | 1 | 1 | 1 | 0 | 0 | 0 | 0 | 0 | 0 | 0 | 0 | 0 | 1 0 0 1 |
| 1 | 1 | 1 | 1 | 1 | 0 | 0 | 0 | 0 | 0 | 0 | 0 | 0 | 0 | 0 | 1 0 1 0 |
| 1 | 1 | 1 | 1 | 0 | 0 | 0 | 0 | 0 | 0 | 0 | 0 | 0 | 0 | 0 | 1 0 1 1 |
| 1 | 1 | 1 | 0 | 0 | 0 | 0 | 0 | 0 | 0 | 0 | 0 | 0 | 0 | 0 | 1 1 0 0 |
| 1 | 1 | 0 | 0 | 0 | 0 | 0 | 0 | 0 | 0 | 0 | 0 | 0 | 0 | 0 | 1 1 0 1 |
| 1 | 0 | 0 | 0 | 0 | 0 | 0 | 0 | 0 | 0 | 0 | 0 | 0 | 0 | 0 | 1 1 1 0 |
| 0 | 0 | 0 | 0 | 0 | 0 | 0 | 0 | 0 | 0 | 0 | 0 | 0 | 0 | 0 | 1 1 1 1 |

FIG. 9

FREQUENCY TRACING CIRCUIT AND METHOD THEREOF

BACKGROUND OF THE DISCLOSURE

1. Field of the Disclosure

The instant disclosure relates to a frequency tracking circuit; in particular, to a frequency tracking circuit proceeding differentiation through a phase difference.

2. Description of Related Art

Regarding wired communications research in recent years, due to a growing demand of users on a network bandwidth, and fiber has advantages of a high bandwidth, a low loss, confidentiality, a long life, and is not subject to electromagnetic interference, and thus after years of industry positioning dialectic and discussion of technical specifications, and related application products market is gradually booming, Ethernet optical fiber network system has become one of crucial medium for broadband communications.

A clock and data recovery (CDR) circuit is an integral part of the Ethernet optical fiber network system, and the CDR is at a receiving end of a receiver, responsible for an appropriate processing of data received, and a main function of the CDR is to remove a noise from the data received and to generate a clock signal synchronous to the data for a next circuit to proceed a digital signal processing. The CDR is divided into two parts: a phase tracking circuit and frequency tracking circuit, to respectively proceed a phase and a frequency correction on the data received according to the clock signal provided by the CDR itself.

However, a frequency tracking circuit in prior arts requires two sets of clock signals with a phase difference of 90 degrees in between to detect a frequency difference, therefore, a design of an oscillator appears to be complicated and results in a waste of circuit area and power consumption. Furthermore, when the frequency tracking circuit in prior art proceeds a frequency tracking, it may interfere with a phase tracking so that an operation of the circuit appears unstable.

SUMMARY OF THE DISCLOSURE

The instant disclosure provides a frequency tracking circuit for a clock and data recovery circuit, and the frequency tracking circuit includes an edge selector, a phase-frequency processor and a digital controlled oscillator. The edge selector receives a data signal and a feedback clock signal and sequentially outputs a data edge signal and a feedback-clock-edge signal. The phase-frequency processor receives the data edge signal and the feedback-clock-edge signal and outputs a frequency adjusting digital signal after executing a differential operation according to a first phase difference and a second phase difference. The digital controlled oscillator is connected to the phase-frequency processor, and the digital controlled oscillator receives the frequency adjusting digital signal so as to adjust a frequency of the feedback clock signal. The phase-frequency processor outputs a frequency tracking signal to the edge selector, and the edge selector utilizes the frequency tracking signal for acquiring the data edge signal and utilizes the data edge signal for acquiring the feedback-clock-edge signal.

In an embodiment of the instant disclosure, a first phase difference is a phase difference between a previous data edge signal and a previous feedback-clock-edge signal, and a second phase difference is a phase difference between the data edge signal and the feedback-clock-edge signal.

In an embodiment of the instant disclosure, a phase of the data edge signal leads a phase of the feedback-clock-edge signal.

In an embodiment of the instant disclosure, the phase-frequency processor includes a time-digital converter, a digital differentiator, a comparator, and a counter. The time-digital converter is connected to an edge selector, and the time-digital converter converts a phase difference between the data edge signal and the feedback-clock-edge signal into a phase difference digital signal. The digital differentiator receives the phase difference digital signal, and the digital differentiator executes a digital difference operation on a digital signal having a second phase difference between the data edge signal and the feedback-clock-edge signal and a digital signal having a first phase difference between a previous data edge signal and a previous feedback-clock-edge signal, and correspondingly outputs a frequency information digital signal. The comparator is connected to the digital differentiator, and the comparator executes a comparison operation according to the frequency information digital signal received, and when a result of the comparison operation executed by the comparator is larger than zero, the comparator outputs a frequency counting digital signal with a frequency-up command; when the result of the comparison operation is smaller than zero, the comparator outputs the frequency counting digital signal with a frequency-down command.

In an embodiment of the instant disclosure, the counter is connected to the comparator, and the counter receives the frequency counting digital signal and accordingly counting outputting a frequency adjusting digital signal, wherein the edge selector, the digital differentiator, the comparator, and the counter further receive a frequency tracking signal.

In an embodiment of the instant disclosure, wherein when the frequency tracking signal is a high level voltage, and the edge selector, the digital differentiator, the comparator, and the counter execute a frequency tracing work, and after the frequency tracking signal experiences enabling duration of high level voltage twice in a row, the digital controlled oscillator adjusts the frequency of the feedback clock signal.

In an embodiment of the instant disclosure, the edge selector includes a first D-type flip-flop and a second D-type flip-flop. A data input end of the first D-type flip flop receives a frequency tracking signal, a clock input end of the first D-type flip-flop receives a data signal, an output end of the first D-type flip-flop outputs a data edge signal. A data input end of the second D-type flip-flop receives the data edge signal, a clock input end of the second D-type flip-flop receives a feedback clock signal, an output end of the second D-type flip-flop outputs a feedback-clock-edge signal.

In an embodiment of the instant disclosure, the time-digital converter includes M first delay units, M second delay units, a NAND gate, M time amplifiers, M of third D-type flip-flops, and an encoder, wherein M is an integer. The M first delay units are connected to each other in series, and each has a first delay time, and the $X^{th}$ of the M first delay units receives the feedback-clock-edge signal which has been delayed for X−1 times of the first delay time, and outputs the feedback-clock-edge signal which has been delayed for X times of the first delay time, wherein X is positive integer between 1 to M. The M second delay units are connected to each other in series, and each has a second delay time, and the $Y^{th}$ of the M second delay units receives the data edge signal which has been delayed for Y−1 times of the second delay time, and outputs the data edge signal which has been delayed for Y times of the second delay time, wherein Y is positive integer between 1 to M. The NAND gate receives the feedback-clock-edge signal which has been delayed for M times of the first delay time and the data edge signal which has been delayed for M times of the second delay time, and outputs the frequency tracking signal. The $Z^{th}$ of the M time amplifiers is correspondingly connected to an output end of the $Z^{th}$ of the M first delay units and an output end of the $Z^{th}$ of a plurality of the M second delays unit, and the amplifiers amplify the phase difference between the data edge signal delayed and the feedback-clock-edge signal delayed, and outputs a phase leading digital signal, wherein Z is positive integer between 1 to M. Each clock input end of the M of the third D-type flip-flops receives the frequency tracking signal NEXT, and the $W^{th}$ of the third D-type flip-flops receives the phase leading digital signal of the $W^{th}$ of the time amplifiers, wherein W is positive integer between 1 to M. The encoder is connected the third D-type lip-flops, and the encoder receives the phase leading digital signal transmitted by the M D-type flip-flops, and proceeds a coding to form a phase difference digital signal, wherein the second delay time is longer than the first delay time, and M is an integer.

In an embodiment of the instant disclosure, wherein the third D-type flip-flop and the encoder further receive the frequency tracking signal.

In an embodiment of the instant disclosure, wherein when the phase of the data edge signal leads the phase of the feedback-clock-edge signal, then a digital logic of the phase leading digital signal is "one"; when the phase of the data edge signal lags the phase of the feedback-clock-edge signal, then the digital logic of the phase leading digital signal is "zero."

In an embodiment of the instant disclosure, the digital differentiator includes a fourth D-type flip-flop and a digital operator. A data input end of the fourth D-type flip-flop receives the phase difference digital signal, and a clock input end of the fourth D-type flip-flop receives the frequency tracking signal. The digital operator is connected to the data input end of the fourth D-type flip-flop and a data output end, and the digital operator takes the phase difference digital signal minus a previous phase difference digital signal, and outputs a frequency information digital signal.

The instant disclosure further provides a frequency tracking method for the clock and data recovery circuit, and the clock and data recovery circuit includes the frequency tracking circuit, and the frequency tracking circuit includes the edge selector, the phase-frequency processor, the digital controlled oscillator, wherein the phase-frequency processor is connected to the edge selector, and the digital controlled oscillator is connected to the edge selector, and the frequency tracking method includes: receiving a data signal and a feedback clock signal, and sequentially outputting a data edge signal and a feedback-clock-edge signal; receiving the data edge signal and the feedback-clock-edge signal; outputting a frequency adjusting digital signal after a differential operation according to a first phase difference second phase difference; adjusting a frequency of the feedback clock signal outputted according to the frequency adjusting digital signal, wherein a phase-frequency processor outputs a frequency tracking signal to an edge selector, and the edge selector utilizes the frequency tracking signal for acquiring the data edge signal and utilizes the data edge signal for acquiring the feedback-clock-edge signal.

To sum up, for the frequency tracking circuit and the method thereof proposed by the embodiments of the instant disclosure, there is only one set of the feedback clock signal CLK required to proceed the frequency tracking, and thus a design of an oscillator appears to be simplified and results in reducing a waste of circuit area and power consumption. The instant disclosure is able to further decrease a frequency difference between the data signal and the feedback clock signal, and thus a relevant restriction regarding the phase tracking is greatly loosen, and leads to an optimistic effect on the circuit designing.

For further understanding of the instant disclosure, reference is made to the following detailed description illustrating the embodiments and examples of the instant disclosure. The description is only for illustrating the instant disclosure, not for limiting the scope of the claim.

BRIEF DESCRIPTION OF THE DRAWINGS

The description recited below refers to accompanying drawings for a specific instruction of embodiments of the instant disclosure, and thereby the instant disclosure is further understood, and in the accompanying drawings:

FIG. 9 shows a coding diagram for cross reference according to an embodiment of the instant disclosure;

DETAILED DESCRIPTION OF PREFERRED EMBODIMENTS

Figure 1A:
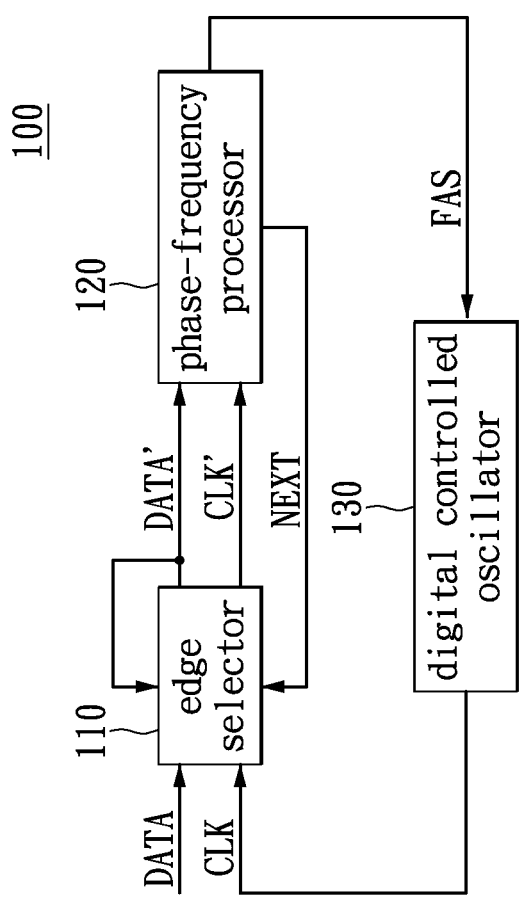
FIG. 1A shows a schematic block diagram of a frequency tracking circuit according to an embodiment of the instant disclosure.

The aforementioned illustrations and following detailed descriptions are exemplary for the purpose of further explaining the scope of the instant disclosure. Other objectives and advantages related to the instant disclosure will be illustrated in the subsequent descriptions and appended drawings. In the drawings, the size and relative sizes of layers and regions may be exaggerated for clarity.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the instant disclosure. As used herein, the term "and/or" includes any and all combinations of one or more of the associated listed items.

[Embodiment of a Frequency Tracking Circuit]

Referring to FIG. 1A, FIG. 1A shows a schematic block diagram of a frequency tracking circuit 100 according to an embodiment of the instant disclosure. As shown in FIG. 1A, the frequency tracking circuit 100 includes an edge selector 110, a phase-frequency processor 120, and a digital controlled oscillator 130. The phase-frequency processor 120 is connected between the edge selector 110 and the digital controlled oscillator 130. The digital controlled oscillator 130 is connected to the edge selector 110.

In the present embodiment, the edge selector 110 receives a data signal DATA and a feedback clock signal CLK and sequentially retrieves edges of the data signal DATA and the feedback clock signal CLK to output a data edge signal DATA' and a feedback-clock-edge signal CLK', and a phase of the data edge signal DATA' leads a phase of the feedback-clock-edge signal CLK'. Furthermore, the edge selector 110 utilizes a frequency tracking signal NEXT to obtain the data edge signal DATA', and then utilizes the data edge signal DATA' to obtain the feedback-clock-edge signal CLK'.

The phase-frequency processor 120 receives the data edge signal DATA' and the feedback-clock-edge signal CLK' and executes a differential operation according to a first phase difference and a second phase difference, and then the phase-frequency processor 120 outputs a frequency adjusting digital signal FAS, wherein the first phase difference is a phase difference between a previous data edge signal DATA' and a previous feedback-clock-edge signal CLK', and the second phase difference is a phase difference between the data edge signal DATA' and the feedback-clock-edge signal CLK'. The phase-frequency processor 120 further outputs a frequency tracking signal NEXT to the edge selector 110 to simply lock on a rising edge of either the data signal DATA or the feedback clock signal CLK to proceed a frequency tracking during each time of a frequency tracking duration. In addition, the so called frequency tracking duration indicates an enabled duration when the frequency tracking signal NEXT is a high level voltage. The frequency tracking circuit of the instant disclosure is for a clock and data recovery (CDR) circuit, and adjusts a frequency of the feedback clock signal CLK between two frequency tracking durations.

The digital controlled oscillator 130 receives the frequency adjusting digital signal FAS so as to adjust a frequency of the feedback clock signal CLK outputted by the digital controlled oscillator 130 itself according to the frequency adjusting digital signal FAS.

There is further instruction for a work mechanism of the frequency tracking circuit 100 in the following description.

Figure 1B:
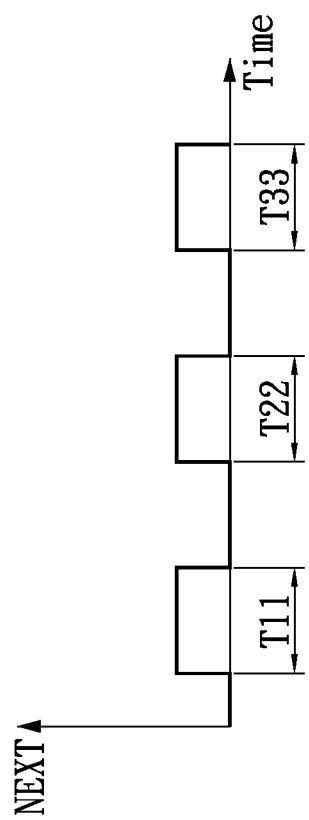
FIG. 1B shows a waveform diagram of a frequency tracking signal driven according to an embodiment of the instant disclosure.

Referring to FIG. 1A with FIG. 1B, FIG. 1B shows a waveform diagram of a frequency tracking signal driven according to an embodiment of the instant disclosure. During a first frequency tracking duration T11, which is when the frequency tracking signal NEXT is enabled as a high level voltage, the edge selector 110 receives the data signal DATA and the feedback clock signal CLK simultaneously, and afterwards, the edge selector 110 first samples a rising edge of the data signal DATA with the frequency tracking signal NEXT, and then outputs the data edge signal DATA'; in an embodiment, the edge selector 110 will be able to sample a first complete rising edge of the data signal DATA. In the meantime, the data edge signal DATA' will be a step signal. Afterwards, the edge selector 110 utilize the data edge signal DATA' to sample a rising edge of the feedback clock signal CLK, and outputs the feedback-clock-edge signal CLK'. In an embodiment, the edge selector 110 will be able to sample a first complete rising edge of the feedback clock signal CLK. In the meantime, the data edge signal DATA' will be a step signal. Accordingly, the phase of the data edge signal DATA' will be lead a phase of the feedback-clock-edge signal CLK'.

Afterwards, still in the first frequency tracking duration T11, the phase-frequency processor 120 receives the data edge signal DATA' and the feedback-clock-edge signal CLK' transmitted by the edge selector 110, and converts the first phase difference between the data edge signal DATA' and the feedback-clock-edge signal CLK' into a digital signal with the first phase difference and have the digital signal stored. Afterwards, the phase-frequency processor 120 outputs the frequency tracking signal NEXT of a low level voltage to the edge selector 110 and also to itself (the phase-frequency processor 120). At the moment, the frequency tracking signal NEXT is a low level voltage, and thus the edge selector 110 does not retrieve an edge of the data signal DATA or the feedback clock signal CLK, and thus the edge selector 110 outputs the data edge signal DATA' of a low level voltage and the feedback-clock-edge signal CLK' of a low level voltage, and there is no phase difference between the data edge signal DATA' and the feedback-clock-edge signal CLK'. After the phase-frequency processor 120 receives the data edge signal DATA' and the feedback-clock-edge signal CLK' without the phase difference, the phase-frequency processor 120 switches the frequency tracking signal NEXT to be a high level voltage to proceed a process of converting the phase difference into the digital signal for another time.

Afterwards, during a second frequency tracking duration T22, the edge selector 110 repeats the mechanism as described above (the mechanism during the first frequency tracking duration T11). Next, the phase-frequency processor 120 converts the second phase difference between the data edge signal DATA' and feedback-clock-edge signal CLK' into the digital signal with the second phase difference.

It is worth noticing that, the phase-frequency processor 120 executes the differential operation according to the first phase difference and the second phase difference, and the phase-frequency processor 120 outputs the frequency adjusting digital signal FAS to the digital controlled oscillator 130, and then the phase-frequency processor 120 will have the digital signal with the second phase difference stored. In other words, the frequency tracking circuit 100 of the instant disclosure tracks the frequency through a concept of acquiring a frequency difference with a phase differentiation. It is noticed that, the first phase difference is the phase difference between the previous data edge signal DATA' and the previous feedback-clock-edge signal CLK' (in the first frequency tracking duration T11), and the second phase difference is a phase difference between the data edge signal DATA' and the feedback-clock-edge signal CLK' (in the second frequency tracking duration T22).

Afterwards, the digital controlled oscillator 130 according to the frequency adjusting digital signal FAS received to increase or decrease the frequency of the feedback clock signal CLK outputted by the digital controlled oscillator 130 itself.

Accordingly, the frequency tracking circuit 100 of the instant disclosure adjusts the frequency of the feedback clock signal CLK after frequency tracking duration twice in a row. For example, after the first frequency tracking duration T11 and the second frequency tracking duration T22, the frequency tracking circuit 100 adjusts the frequency of the feedback clock signal CLK. Next, after the second frequency tracking duration T22 and a third frequency tracking duration T33, the frequency tracking circuit 100 adjusts the frequency of the feedback clock signal CLK again, and so on, and it lasts until a frequency tracking mechanism of the frequency tracking circuit 100 leads the feedback clock signal CLK to be stable.

In comparison to the prior arts, there is only one set of the feedback clock signal CLK required for the frequency tracking circuit 100 to proceed the frequency tracking, and thus a design of an oscillator appears to be simplified and results in reducing a waste of circuit area and power consumption. Furthermore, when the frequency tracking circuit 100 proceeds a frequency tracking, a phase tracking will not be interfered so as to provide a stable circuit operation.

For a specific instruction on an operation process of the frequency tracking circuit 100 of the instant disclosure, there is at least one of the embodiments for further instruction.

In the following embodiments, there are only parts different from embodiments in FIG. 1A described, and the omitted parts are indicated to be identical to the embodiments in FIG. 1A. In addition, for an easy instruction, similar reference numbers or symbols refer to elements alike.

[Embodiment of a Frequency Tracking Circuit]

Figure 2A:
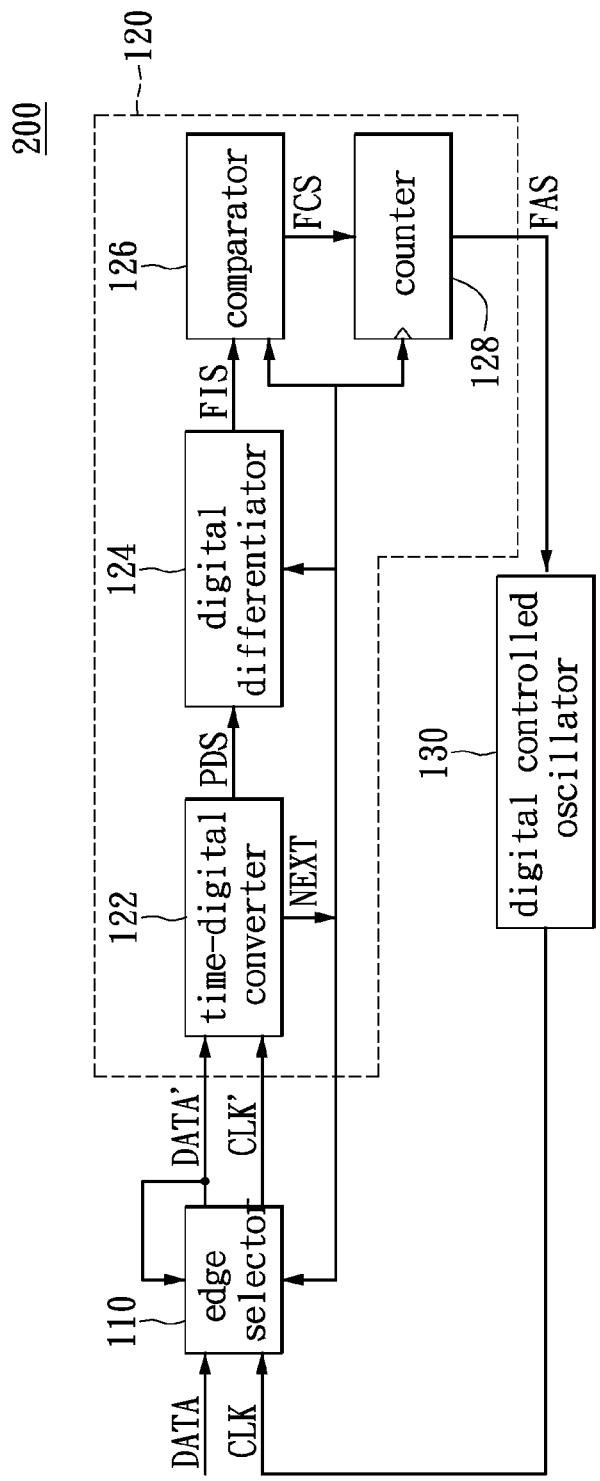
FIG. 2A shows a schematic block diagram of a frequency tracking circuit according to an embodiment of the instant disclosure.

Referring to FIG. 2A, FIG. 2A shows a schematic block diagram of a frequency tracking circuit according to an embodiment of the instant disclosure. Different from the embodiment in the FIG. 1, in the present embodiment, a phase-frequency processor 120 includes a time-digital converter 122, a digital differentiator 124, a comparator 126, and a counter 128. The time-digital converter 122 is connected to an edge selector 110. The digital differentiator 124 is connected between the time-digital converter 122 and the comparator 126. The counter 126 is connected between the digital differentiator 124 and the counter 128.

The time-digital converter 122 converts a phase difference between the data edge signal DATA' and the feedback-clock-edge signal CLK' into a phase difference digital signal PDS, which is to convert a time difference between the two signals into a digital signal. The digital differentiator 124 executes a digital difference operation on a digital signal having a second phase difference between the data edge signal DATA' and the feedback-clock-edge signal CLK' and a digital signal having a first phase difference between a previous data edge signal DATA' and a previous feedback-clock-edge signal CLK', and the digital differentiator 124 correspondingly outputs a frequency information digital signal FIS, which means that the frequency information digital signal FIS has an information about whether the data signal DATA or the feedback clock signal CLK has a higher frequency. The comparator 126 executes a comparison operation according to the frequency information digital signal FIS received. In the present embodiment, when a result of the comparison operation executed by the comparator 126 is larger than zero, which means that a frequency of the data signal DATA is higher than a frequency of the feedback clock signal CLK, and the comparator 126 outputs a frequency counting digital signal FCS with a frequency-up command to the counter 128 to increase a counting value of the counter 128; when the result of the comparison operation executed by the comparator 126 is smaller than zero, which means that the frequency of the data signal DATA is lower than the frequency of the feedback clock signal CLK, and the comparator 126 outputs the frequency counting digital signal FCS with a frequency-down command to the counter 128 to decrease the counting value of the counter 128. The counter 128 receives the frequency counting digital signal FCS and according to the frequency counting digital signal FCS to increase or decrease the counting value, and outputs a frequency adjusting digital signal FAS corresponding to the counting value to a digital controlled oscillator 130 to adjust the frequency of the feedback clock signal CLK. The edge selector 110, the digital differentiator 122, the comparator 126, and the counter 128 further receive a frequency tracking signal NEXT, wherein when the frequency tracking signal NEXT is a high level voltage in a enabling duration, and the edge selector 110, the digital differentiator 124, the comparator 126, and the counter 128 execute a frequency tracing work. In addition, after the frequency tracking signal NEXT experiences enabling duration of high level voltage twice in a row, the digital controlled oscillator 130 adjusts the frequency of the feedback clock signal CLK. For example, after the first frequency tracking duration T11 and the second frequency tracking duration T22, the frequency tracking circuit 200 adjusts the frequency of the feedback clock signal CLK. Next, after the second frequency tracking duration T22 and a third frequency tracking duration T33, the frequency tracking circuit 200 adjusts the frequency of the feedback clock signal CLK again, and so on, and it lasts until a frequency tracking mechanism of the frequency tracking circuit 200 leads the feedback clock signal CLK to be stable.

There is further instruction in teaching a detailed operation of the frequency tracking circuit 200 in the following description.

Figure 2B:
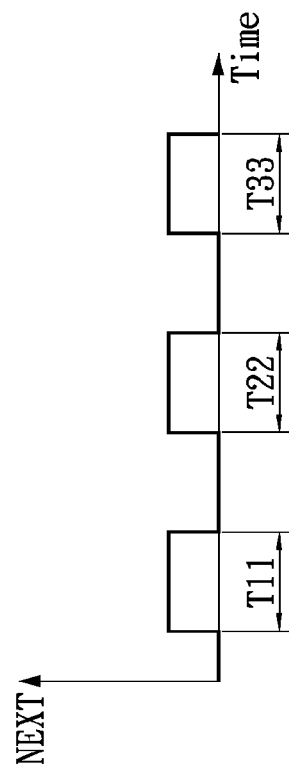
FIG. 2B shows a waveform diagram of a frequency tracking signal driven according to an embodiment of the instant disclosure.

Referring to FIG. 2A with FIG. 2B, FIG. 2B shows a waveform diagram of a frequency tracking signal driven according to an embodiment of the instant disclosure. During a first frequency tracking duration T11, which is when the frequency tracking signal NEXT is enabled as a high level voltage, the edge selector 110 receives the data signal DATA and the feedback clock signal CLK simultaneously, and afterwards, the edge selector 110 first samples an rising edge of the data signal DATA with the frequency tracking signal NEXT, and then outputs the data edge signal DATA'; in an embodiment, the edge selector 110 will be able to sample a first complete rising edge of the data signal DATA. In the meantime, the data edge signal DATA' will be a step signal. Afterwards, the edge selector 110 utilize the data edge signal DATA' to sample a rising edge of the feedback clock signal CLK, and outputs the feedback-clock-edge signal CLK'. In an embodiment, the edge selector 110 will be able to sample a first complete rising edge of the feedback clock signal CLK. In the meantime, the data edge signal DATA' will be a step signal. Accordingly, the phase of the data edge signal DATA' will be lead a phase of the feedback-clock-edge signal CLK'.

Afterwards, still in the first frequency tracking duration T11, the phase-frequency processor 120 receives the data edge signal DATA' and the feedback clock signal CLK transmitted by the edge selector 110, and converts the first phase difference between the data edge signal DATA' and the feedback-clock-edge signal CLK' into a digital signal with the first phase difference and transmit to the digital differentiator 124 to proceed a differentiation. Since there is only the digital signal with the first phase difference in the digital differentiator 124, and thus the digital signal which has the first phase difference differentiated and obtained a digital logic as zero is sent to the comparator 126, and the digital differentiator 124 stores the digital signal having the first phase difference. After the comparator 126 receives the frequency information digital signal FIS having the digital logic as zero, transmitting the digital signal with a no-adjusting-frequency command (which is the frequency counting digital signal FCS with the digital logic "zero") to the counter 128. Next, after the counter 128 receives the frequency counting digital signal FCS with the digital logic as "zero," the counting value of the counter 124 will not be increased or decreased, and thus a frequency adjusting digital signal FAS transmitted to the digital controlled oscillator 130 by the counter 128 will not adjust the frequency of the feedback clock signal CLK. It is worth mentioning that, after the time-digital converter122 converts the phase difference into the digital signal, the time-digital converter122 outputs the frequency tracking signal NEXT of a low level voltage to the edge selector 110, the digital differentiator 124, the comparator 126, the counter 128, and the phase-frequency processor 120 itself. At the moment, the frequency tracking signal NEXT is a low level voltage, and thus the edge selector 110 does not retrieve an edge of the data signal DATA or the feedback clock signal CLK to prevent from interfering with the frequency tracking mechanism during the first frequency tracking duration T11. Therefore, the edge selector 110 outputs the data edge signal DATA' of a low level voltage and the feedback clock signal CLK' of a low level voltage, and there is no phase difference between the data edge signal DATA' and the feedback-clock-edge signal CLK' at the moment. After the phase-frequency processor 120 receives the data edge signal DATA' and the feedback-clock-edge signal CLK' without the phase difference, the phase-frequency processor 120 switches the frequency tracking signal NEXT to be a high level voltage to proceed a process of converting the phase difference into the digital signal for another time.

Afterwards, during a second frequency tracking duration T22, the edge selector 110 repeats the mechanism as described above (the mechanism during the first frequency tracking duration T11). Next, the phase-frequency processor 120 converts the second phase difference between the data edge signal DATA' and the feedback clock signal CLK' into the digital signal with the second phase difference. It is worth noticing that, at the moment, the digital signal with the first phase difference is stored inside the digital differentiator 124, and after the digital differentiator 124 receives the digital signal with the second phase difference, the digital differentiator 124 takes the digital signal with the second phase difference minus the digital signal with the first phase difference. In other words, the digital differentiator 124 runs a differential operation according to the first phase difference and the second phase difference. Afterwards, the digital differentiator 124 stores the digital signal with the second phase difference, and transmits the frequency information digital signal FIS representing the result of the differential operation to the comparator 126. Next, the comparator 126 runs a comparison operation on the frequency information digital signal FIS received. In the present embodiment, when a result of the comparison operation executed by the comparator 126 is larger than zero, which means that a frequency of the data signal DATA is higher than a frequency of the feedback clock signal CLK, and the comparator 126 outputs a frequency counting digital signal FCS with a frequency-up command to the counter 128 to increase a counting value of the counter 128; when the result of the comparison operation executed by the comparator 126 is smaller than zero, which means that the frequency of the data signal DATA is lower than the frequency of the feedback clock signal CLK, and the comparator 126 outputs the frequency counting digital signal FCS with a frequency-down command to the counter 128 to decrease the counting value of the counter 128. The counter 128 receives the frequency counting digital signal FCS and according to the frequency counting digital signal FCS to increase or decrease the counting value, and outputs the frequency adjusting digital signal FAS corresponding to the counting value to the digital controlled oscillator 130 to adjust the frequency of the feedback clock signal CLK. It is noticed that the first phase difference is a phase difference between a previous data edge signal DATA' and a previous feedback-clock-edge signal CLK', and the second phase difference is a phase difference between the data edge signal DATA' and the feedback-clock-edge signal CLK'.

Afterwards, the digital controlled oscillator 130 according to the frequency adjusting digital signal FAS received to increase or decrease the frequency of the feedback clock signal CLK outputted by the digital controlled oscillator 130 itself.

Accordingly, the frequency tracking circuit 100 of the instant disclosure adjusts the frequency of the feedback clock signal CLK after frequency tracking duration twice in a row. For example, after the first frequency tracking duration T11 and the second frequency tracking duration T22, the frequency tracking circuit 100 adjusts the frequency of the feedback clock signal CLK. Next, after the second frequency tracking duration T22 and a third frequency tracking duration T33, the frequency tracking circuit 100 adjusts the frequency of the feedback clock signal CLK again, and so on, and it lasts until a frequency tracking mechanism of the frequency tracking circuit 100 leads the feedback clock signal CLK to be stable.

Accordingly, there is only one set of the feedback clock signal CLK required for the frequency tracking circuit 200 of the instant disclosure to proceed the frequency tracking, and thus a design of an oscillator appears to be simplified and results in reducing a waste of circuit area and power consumption. In addition, when the frequency tracking circuit 100 proceeds a frequency tracking, a phase tracking will not be interfered so as to provide a stable circuit operation. Furthermore, the instant disclosure is able to further decrease the frequency difference between the data signal DATA and the feedback clock signal CLK, and relevant restriction regarding the phase tracking is greatly loosen, and leads to an optimistic effect on the circuit designing.

For a specific instruction on an operation process of the edge selector 110, the time-digital converter 122, the digital differentiator 124 of the instant disclosure, there is at least one of the embodiments for further instruction.

In the following embodiments, there are only parts different from embodiments in FIG. 2A described, and the omitted parts are indicated to be identical to the embodiments in FIG. 2A. In addition, for an easy instruction, similar reference numbers or symbols refer to elements alike.

[Embodiment of a Frequency Tracking Circuit]

Figure 3:
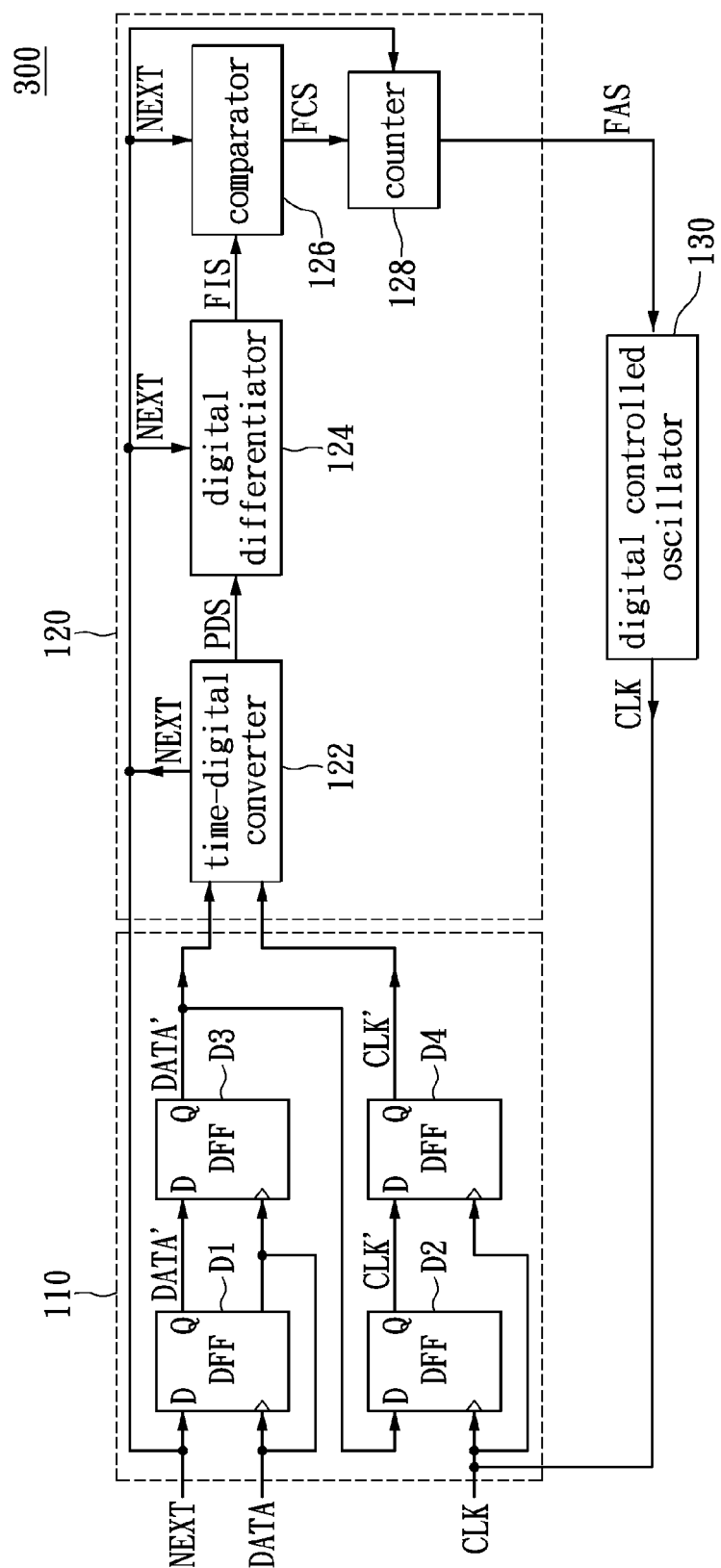
FIG. 3 shows a schematic diagram of a frequency tracking circuit with a detailed circuit diagram of an edge selector according to an embodiment of the instant disclosure.

Referring to FIG. 3, FIG. 3 shows a schematic diagram of a frequency tracking circuit with a detailed circuit diagram of an edge selector according to an embodiment of the instant disclosure. Different from the embodiment in FIG. 2A, the edge selector 110 of the frequency tracking circuit 300 in the present embodiment includes D-type flip-flops D1-D4. A data input end of the D-type flip-flop D1 receives a frequency tracking signal NEXT, a clock input end of the D-type flip-flop D1 receives a data signal DATA, an output end of the D-type flip-flop D1 outputs a data edge signal DATA'. A data input end of the D-type flip-flop D3 receives the data edge signal DATA', a clock input end of the D-type flip-flop D3 receives the data signal DATA, an output end of the D-type flip-flop D3 outputs the data edge signal DATA'. A data input end of the D-type flip-flop D2 receives the data edge signal DATA', a clock input end of the D-type flip-flop D2 receives a feedback clock signal CLK, an output end of the D-type flip-flop D2 outputs a feedback-clock-edge signal CLK'. A data input end of the D-type flip-flop D4 receives the feedback-clock-edge signal CLK', a clock input end of the D-type flip-flop D4 receives the feedback clock signal CLK, an output end of the D-type flip-flop D4 outputs feedback-clock-edge signal CLK'. In another embodiment, there are only D-type flip-flops D1 and D2 required for the edge selector 110, and D-type flip-flops D3 and D4 in the present embodiment are to solve a possible problem of transient state, and it is not limited thereto.

There is further instruction on a detailed operation of the edge selector 110.

Figure 4:
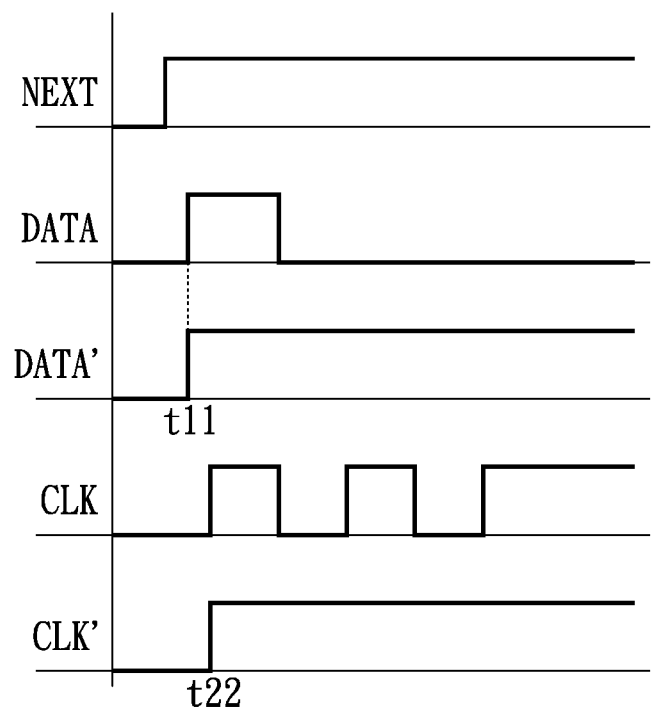
FIG. 4 shows a waveform diagram of a data edge signal and a feedback-clock-edge signal both driven according to an embodiment of the instant disclosure.

Referring FIG. 3 with FIG. 4, FIG. 4 shows a waveform diagram of a data edge signal and a feedback-clock-edge signal both driven according to an embodiment of the instant disclosure. Under a state of the frequency tracking signal NEXT being a high level voltage (which means a digital logic to be "one"), when the data signal DATA is converted from a low level voltage into a high level voltage at a time point "t11," which means that the digital logic is to be converted from the digital logic "zero" to the digital logic "one," and the data edge signal DATA' will be converted from a low level voltage into a high level voltage at the time point "t11" as well, which means that an edge information of the data signal DATA is retrieved, and at the moment, the data edge signal DATA' is a step signal. Afterwards, the edge selector 110 utilize the feedback clock signal CLK to sample the data edge signal DATA', and when the feedback clock signal CLK is converted from a low level voltage to a high level voltage at a time point "t22," and the feedback-clock-edge signal CLK' will be converted from a low level voltage to a high level voltage at a time point "t22" as well, which means that the edge information of the feedback clock signal CLK has been retrieved, and at the moment, the feedback-clock-edge signal CLK' is a step signal.

Figure 5:
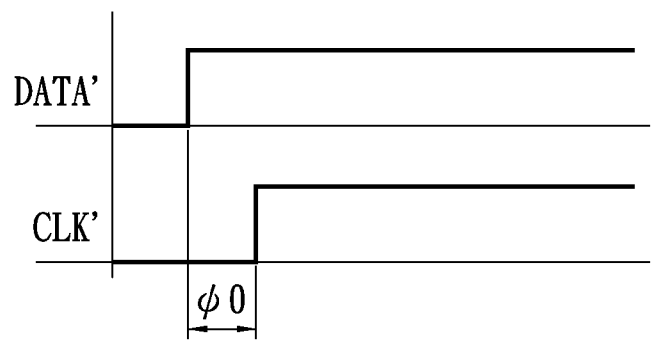
FIG. 5 shows a waveform diagram of a data edge signal and a feedback-clock-edge signal driven according to an embodiment of the instant disclosure.

It is worth mentioning that, since the edge selector 110 first retrieves the edge information of the data signal DATA, then retrieves the edge information of the feedback clock signal CLK, and thus a phase of the data edge signal DATA' leads a phase of the feedback-clock-edge signal CLK'. Referring to FIG. 5, FIG. 5 shows a waveform diagram of a data edge signal and a feedback-clock-edge signal driven according to an embodiment of the instant disclosure. As shown in FIG. 5, there is a phase difference "Φ0" between the data edge signal DATA' and the feedback-clock-edge signal.

There is further instruction regarding the time-digital converter 122.

Figure 6:
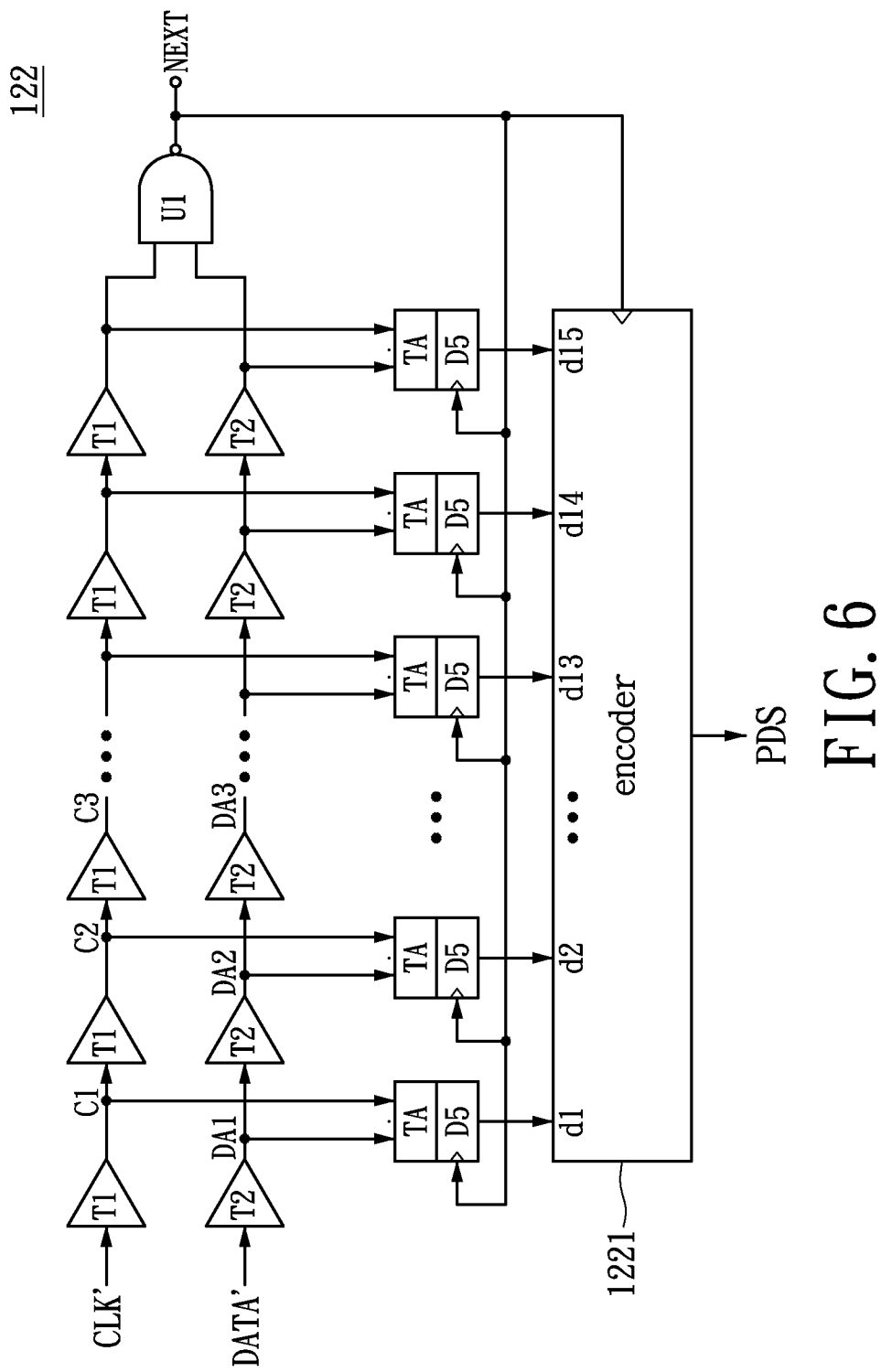
FIG. 6 shows a detailed circuit diagram of a time-digital converter according to an embodiment of the instant disclosure.

Referring to FIG. 6, FIG. 6 shows a detailed circuit diagram of a time-digital converter according to an embodiment of the instant disclosure. As shown in FIG. 6, the time-digital converter 122 includes M first delay units T1, M second delay units T2, a NAND gate U1, M time amplifiers TA, M D-type flip-flops D5, and an encoder 1221, wherein M is an integer. The M first delay units T1 are connected to each other in series. The M second delay units T2 are connected to each other in series. The Zth of the M time amplifiers TA is correspondingly connected to an output end of the Zth of the M first delay units T1 and an output end of the Zth of a plurality of the M second delay units T2, wherein Z is positive integer between 1 to M. M D-type flip-flops D5 are respectively connected to the time amplifiers TA corresponded. The encoder 1221 is connected to a plurality of the D-type lip-flops D5.

In the present embodiment, each of the M first delay units T1 has a first delay time, and each of the M second delay units T2 has a second delay time, wherein the second delay time is longer than the first delay time. The $X^{th}$ of a plurality of the M first delay units T1 receives the feedback-clock-edge signal CLK' which has been delayed for X−1 times of the first delay time, and outputs the feedback-clock-edge signal CLK' which has been delayed for M times of the first delay time, wherein X is positive integer between 1 to M. The $Y^{th}$ of a plurality of the M second delay units T2 receives the data edge signal DATA' which has been delayed for Y−1 times of the second delay time, and outputs the data edge signal DATA' which has been delayed for M times of the second delay time, wherein Y is positive integer between 1 to M. The NAND gate receives the feedback-clock-edge signal CLK' which has been delayed for M times of the first delay time and the data edge signal DATA' which has been delayed for M times of the second delay time, and outputs the frequency tracking signal NEXT. A plurality of the time amplifiers TA are for amplifying the phase difference between the data edge signal DATA' delayed and the feedback-clock-edge signal CLK' delayed, and outputs a phase leading digital signal to the D-type flip-flop D5 corresponded. Each clock input end of the M D-type flip-flops D5 receives the frequency tracking signal NEXT, and the $W^{th}$ of the D-type flip-flops D5 correspondingly receives the phase leading digital signal of the $W^{th}$ of the time amplifiers, wherein W is positive integer between 1 to M. When the frequency tracking signal is a high level voltage, the encoder 1221 receives the phase leading digital signal transmitted by the M D-type flip-flops D5, and proceeds a coding to form a phase difference digital signal PDS.

There is further instruction on a relevant operation regarding the time-digital converter 122. Before instruction, it is clarified that, in the present embodiment, when the phase of the data edge signal DATA' leads the phase of the feedback-clock-edge signal CLK', then a digital logic of the phase leading digital signal is "one"; when the phase of the data edge signal DATA' lags the phase of the feedback-clock-edge signal CLK', then the digital logic of the phase leading digital signal is "zero."

Figure 7:
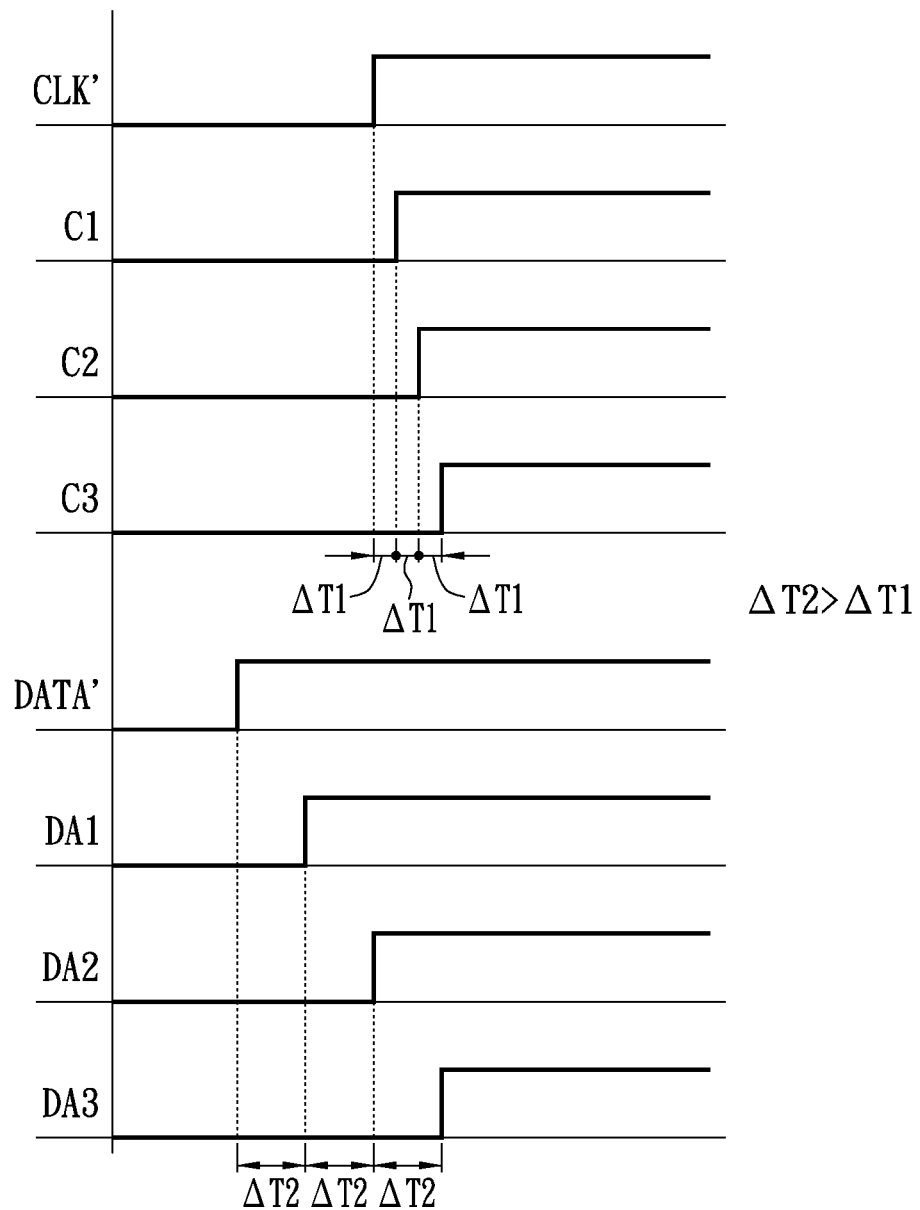
FIG. 7 shows a waveform diagram of a data edge signal delayed and a feedback-clock-edge signal both driven according to an embodiment of the instant disclosure.
Figure 8:
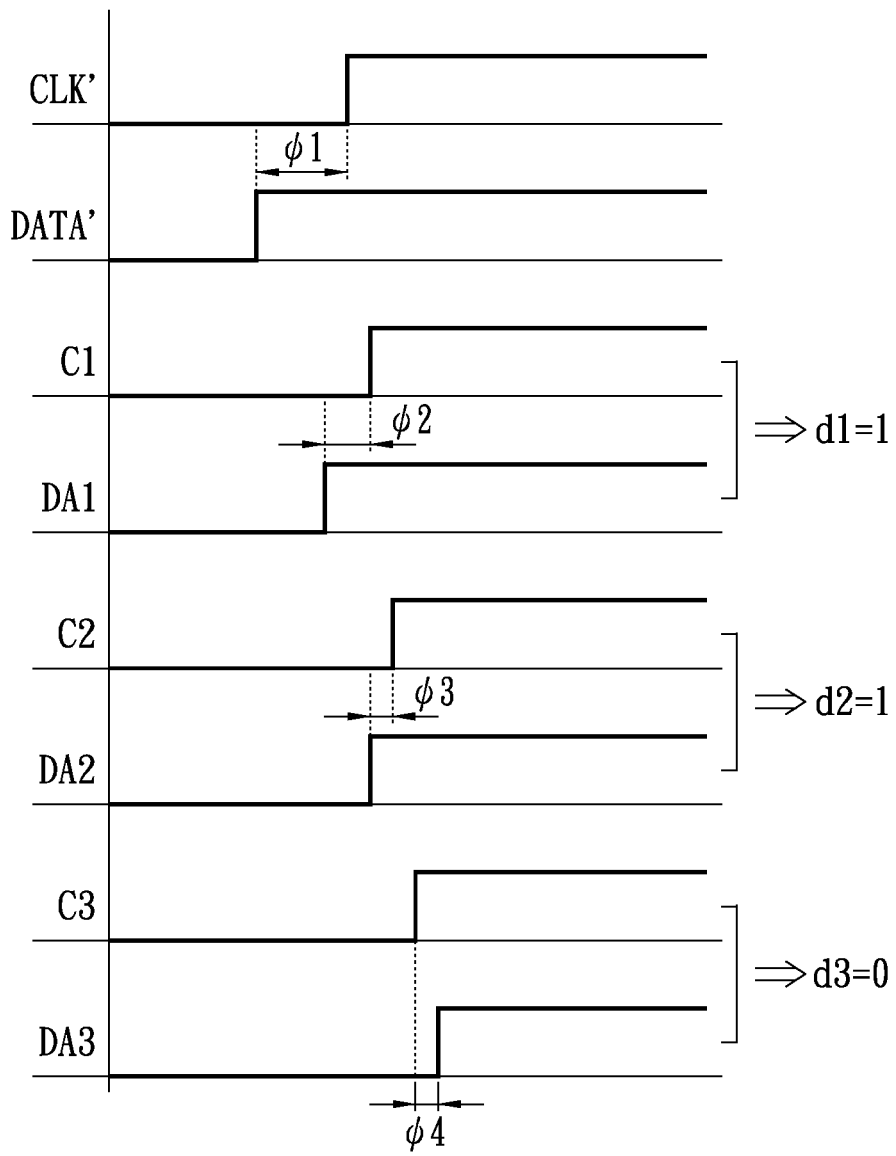
FIG. 8 shows a waveform diagram of a data edge signal delayed and a feedback-clock-edge signal both driven according to an embodiment of the instant disclosure.
Figure 10:
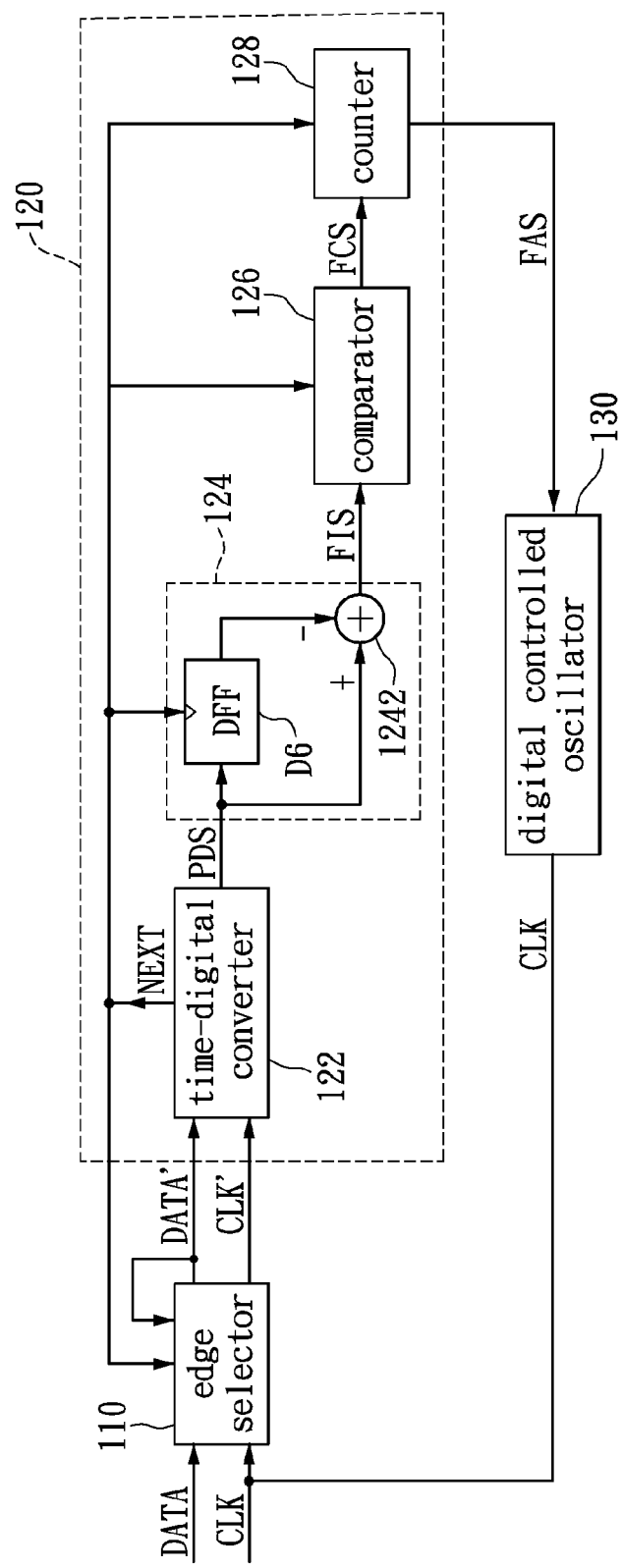
FIG. 10 shows a schematic block diagram of a frequency tracking circuit with a digital differentiator according to an embodiment of the instant disclosure.

Referring FIGS. 6-8, FIG. 7 shows a waveform diagram of a data edge signal delayed and a feedback-clock-edge signal both driven according to an embodiment of the instant disclosure. FIG. 8 shows a waveform diagram of a data edge signal delayed and a feedback-clock-edge signal both driven according to an embodiment of the instant disclosure. For an easy instruction of the instant disclosure, here it is taken 3 times of delay as an example, and people skilled in the art should be able to reason by analogy to apply to other conditions. The first delay unit T1 and the second delay unit T2 in a first grade will be described in detail here first, and the first delay unit T1 and the second delay unit T2 in other grades have a similar work mechanism. In the first grade, after the first delay unit T1 and the second delay unit T2 respectively receives the feedback-clock-edge signal CLK' and the data edge signal DATA', the first delay unit T1 and the second delay unit T2 will respectively delay a first delay time ΔT1 and a second delay time ΔT2 of the feedback-clock-edge signal CLK' and the data edge signal DATA', and respectively and correspondingly transmit the feedback-clock-edge signal CLK which has been delayed for the first delay time ΔT1 and the data edge signal DATA' which has been delayed for the second delay time ΔT2 to the time amplifier TA, a next grade first delay unit T1, and the second delay unit T2.

When the time amplifier TA receives the feedback-clock-edge signal CLK which has been delayed for the first delay time ΔT1 and the data edge signal DATA' which has been delayed for the second delay time ΔT2, the time amplifier TA amplifies the phase difference between the feedback-clock-edge signal CLK which has been delayed for the first delay time ΔT1 and the data edge signal DATA' which has been delayed for the second delay time. The phase of the data edge signal DATA' which has been delayed for the second delay time ΔT2 once leads the feedback-clock-edge signal CLK which has been delayed for the first delay time ΔT1 once, and thus the time amplifier TA outputs the phase leading digital signal of the digital logic as "one" to the D-type flip-flop D5 corresponded. Afterwards, when the frequency tracking signal NEXT is converted from the low level voltage to the high level voltage, the D-type flip-flop D5 transmits the phase leading digital signal to the encoder 1221, which means that the encoder 1221 receives the phase leading digital signal of the digital logic as "one."

In the present embodiment, it is clarified that "c1," "c2," and "c3" respectively represents the feedback-clock-edge signal CLK delayed for one time, for two times, and for three times; DA1, DA2, and DA3 respectively represents the data edge signal DATA' delayed for one time, for two times, and for three times, wherein there are respectively the phase differences of Φ1, Φ2, Φ3, and Φ4 existed. The phase of the data edge signal DATA' outputted from the edge selector 110 leads the phase of the feedback-clock-edge signal CLK', and the first delay time ΔT1 is shorter than the second delay time ΔT2. Therefore, it is known from FIGS. 7 and 8, after the feedback-clock-edge signal CLK' has delayed for the first delay time ΔT1 for three times, and the data edge signal DATA' has delayed the second delay time ΔT2 for three times, the phase of the feedback-clock-edge signal CLK' starts to lead the phase of the data edge signal DATA'. Therefore, in a time-digital converter 122 of the fifteenth grade, the encoder 1221 receives the phase leading digital signal of "11000_00000_00000" transmitted by the plurality of the D-type flip-flops D5, which means that "d1" represents the digital logic of "one," and "d2" represents the digital logic of "one," and d3-35 represent the digital logic of "zero."

Referring to FIG. 9, FIG. 9 shows a coding diagram for cross reference according to an embodiment of the instant disclosure. It is known from the present embodiment, after the encoder 1221 receives the frequency tracking signal NEXT of a high level voltage, "11000_00000_00000" will be encoded as the phase difference digital signal PDS of "1101" by the encoder 1221, and be transmitted to the digital differentiator 124 for a differential operation. It is worth mentioning that, in FIG. 9, the more the "d1-d15," which represent digital logic of "one," the bigger the phase is between the data edge signal DATA' and the feedback-clock-edge signal CLK', and the smaller a decimal value which the phase difference digital signal PDS represents; on the contrary, the less the "d1-d15," which represent digital logic of "one," the smaller the phase is between the data edge signal DATA' and the feedback-clock-edge signal CLK', and the larger a decimal value which the phase difference digital signal PDS represents.

For further instruction, please refer to FIGS. 6-10, FIG. 10 shows a schematic block diagram of a frequency tracking circuit with a digital differentiator according to an embodiment of the instant disclosure. The digital differentiator 124 includes a D-type flip-flop D6 and a digital operator 1242. A data input end of the D-type flip-flop D6 receives the phase difference digital signal PDS, and a clock input end of the D-type flip-flop D6 receives the frequency tracking signal NEXT. The digital operator 1242 is connected to the data input end of the D-type flip-flop D6 and a data output end, and the digital operator 1242 takes the phase difference digital signal PDS minus a previous phase difference digital signal PDS, and outputs a frequency information digital signal FIS.

Furthermore, if the encoder 1221 receives the frequency tracking signal NEXT of a high level voltage, "11000_00000_00000" will be encoded as the phase difference digital signal PDS of "1101" by the encoder 1221, and be transmitted to the digital differentiator 124 for a differential operation. At the moment, the phase difference digital signal PDS at the output end of the D-type flip-flop D6 is "1101," and thus when the D-type flip-flop D6 receives the phase difference digital signal PDS of "1110," the digital differentiator 124 utilizes the digital operator 1242 to have the phase difference digital signal PDS of "1110" minus the phase difference digital signal PDS of "1101" to obtain the frequency information digital signal FIS, wherein it is worth noticing that, the frequency tracking signal NEXT is a low level voltage (digital logic is "zero") at the moment, and after through the differential operation and outputted, the frequency tracking signal NEXT will be converted as a high level voltage to store the phase difference digital signal PDS of "1110" to the output end of the D-type flip-flop D6. Afterwards, the digital operator 1242 will transmit the frequency information digital signal FIS with the operating result to the comparator 126 to proceed a comparison operation. When the comparator 126 executes the comparison operation and determines that the operation result is larger than zero, the comparator 126 will output a frequency counting digital signal FCS with a frequency-up command to the counter 128. The counter 128 increases a counting value of the counter 128 according to the frequency counting digital signal FCS, and the counter 128 outputs the frequency adjusting digital signal FAS to the digital controlled oscillator 130 to increase the frequency of the feedback clock signal CLK outputted by the digital controlled oscillator 130.

On the other hand, if the encoder 1221 receives the phase leading digital signal of "11110_00000_00000" in a next frequency tracking duration, and the encoder 1221 will encode the phase leading digital signal as the phase difference digital signal PDS of "1011", and be transmit to the digital differentiator 124 for a differential operation. At the moment, the phase difference digital signal PDS at the output end of the D-type flip-flop D6 is "1101," and thus when the D-type flip-flop D6 receives the phase difference digital signal PDS of "1011," the digital differentiator 124 utilizes the digital operator 1242 to have the phase difference digital signal PDS of "1011" minus the phase difference digital signal PDS of "1101" to obtain the frequency information digital signal FIS, wherein it is worth noticing that, the frequency tracking signal NEXT is a low level voltage (digital logic is "zero") at the moment, and after through the differential operation and outputted, the frequency tracking signal NEXT will be converted as a high level voltage to store the phase difference digital signal PDS of "1011" to the output end of the D-type flip-flop D6. Afterwards, the digital operator 1242 will transmit the frequency information digital signal FIS with the operating result to the comparator 126 to proceed a comparison operation. When the comparator 126 executes the comparison operation and determines that the operation result is smaller than zero, the comparator 126 will output a frequency counting digital signal FCS with a frequency-down command to the counter 128. The counter 128 decreases the counting value of the counter 128 according to the frequency counting digital signal FCS, and the counter 128 outputs the frequency adjusting digital signal FAS to the digital controlled oscillator 130 to decrease the frequency of the feedback clock signal CLK outputted by the digital controlled oscillator 130.

In an embodiment, the frequency of the data signal DATA is 1000 MHz, and through the frequency tracking circuit of the instant disclosure to constantly adjust the frequency of the feedback clock signal CLK, and finally the frequency of the feedback clock signal CLK becomes oscillating back and forth between the two steady states of the frequency of 1001

MHz and 999 MHz. It is worth mentioning that, the phase of the data signal DATA is still leads the phase of the feedback clock signal. Afterwards, through a phase locking mechanism of the phase tracking circuit of a clock and data recovery circuit to unify the phases of the data signal DATA and the feedback clock signal. In another embodiment, the phase locking part is achieved with an assistance of an injection phase lock technology.

In comparison to the prior arts, there are two sets of oscillators with a phase difference of 90 degrees in between required for detecting a frequency difference; however, the frequency tracking circuit of the instant disclosure simply requires a set of the clock signal to achieve the frequency detecting mechanism. Furthermore, the instant disclosure is to use the time-digital converter to record the phase difference between the data signal and the feedback clock signal, and to run a differential operation through a digital control, and finally to generate a digital signal to control an adjusting of the frequency, and to reduce an inference from the control signal of the frequency tracking with the control signal of the phase tracking.

[Embodiment of a Frequency Tracking Method]

Figure 11:
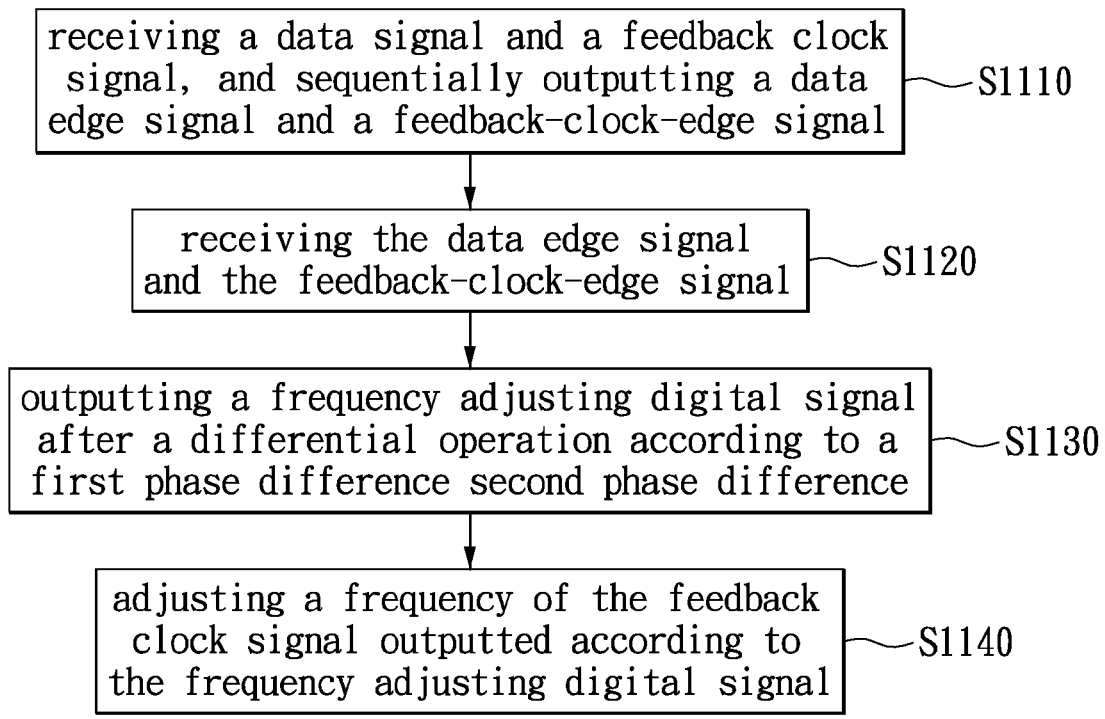
FIG. 11 shows a flow chart of a frequency tracking method according to an embodiment of the instant disclosure.

Referring to FIG. 11, FIG. 11 shows a flow chart of a frequency tracking method according to an embodiment of the instant disclosure. The explanatory steps of process of the embodiments may be embodied with the frequency tracking circuit 100 or 200 shown in FIG. 1A or FIG. 2A, and thus please refer to FIG. 1A or 2A for further understanding of the instruction. The frequency tracking method includes: receiving a data signal and a feedback clock signal, and sequentially outputting a data edge signal and a feedback-clock-edge signal (S1110); receiving the data edge signal and the feedback-clock-edge signal (S1120); outputting a frequency adjusting digital signal after a differential operation according to a first phase difference second phase difference (S1130); adjusting a frequency of the feedback clock signal outputted according to the frequency adjusting digital signal (S1140), wherein a phase-frequency processor outputs a frequency tracking signal to an edge selector, and the edge selector utilizes the frequency tracking signal for acquiring the data edge signal and utilizes the data edge signal for acquiring the feedback-clock-edge signal. In addition, a phase of the data edge signal leads a phase of the feedback-clock-edge signal.

Relevant details of the steps of the frequency tracking method regarding the frequency tracking circuit are described in the embodiments of FIGS. 1A-10, and thus it is not repeated thereto. It is clarified that, a sequence of steps in FIG. 11 is set for a need to instruct easily, and thus the sequence of the steps is not used as a condition in demonstrating the embodiments of the instant disclosure.

To sum up, for the frequency tracking circuit and the method thereof proposed by the embodiments of the instant disclosure, there is only one set of the feedback clock signal CLK required to proceed the frequency tracking, and thus a design of an oscillator appears to be simplified and results in reducing a waste of circuit area and power consumption. The instant disclosure is able to further decrease a frequency difference between the data signal and the feedback clock signal, and thus a relevant restriction regarding the phase tracking is greatly loosen, and leads to an optimistic effect on the circuit designing.

In at least one of the embodiments of the instant disclosure, when the frequency tracking circuit proceeds a frequency tracking, a phase tracking will not be interfered so as to provide a stable circuit operation.

In at least one of the embodiments of the instant disclosure, the instant disclosure is able to further decrease a frequency difference between the data signal and the feedback clock signal, and thus a relevant restriction regarding the phase tracking is greatly loosen, and leads to an optimistic effect on the circuit designing.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A frequency tracking circuit for a clock and data recovery circuit, the frequency tracking circuit comprising:
   an edge selector, receiving a data signal and a feedback clock signal and sequentially outputting a data edge signal and a feedback-clock-edge signal;
   a phase-frequency processor, receiving the data edge signal and the feedback-clock-edge signal, and outputting a frequency adjusting digital signal after executing a differential operation according to a first phase difference and a second phase difference; and
   a digital controlled oscillator, connected to the phase-frequency processor, the digital controlled oscillator receiving the frequency adjusting digital signal so as to adjust a frequency of the feedback clock signal,
   wherein the phase-frequency processor outputs a frequency tracking signal to the edge selector, and the edge selector utilizes the frequency tracking signal for acquiring the data edge signal and utilizes the data edge signal for acquiring the feedback-clock-edge signal.

2. The frequency tracking circuit according to claim 1, wherein the first phase difference is a phase difference between a previous data edge signal and a previous feedback-clock-edge signal, and the second phase difference is a phase difference between the data edge signal and the feedback-clock-edge signal.

3. The frequency tracking circuit according to claim 1, wherein a phase of the data edge signal leads a phase of the feedback-clock-edge signal.

4. The frequency tracking circuit according to claim 1, wherein the phase-frequency processor comprises:
   a time-digital converter, connected to the edge selector, the time-digital converter converting a phase difference between the data edge signal and the feedback-clock-edge signal into a phase difference digital signal;
   a digital differentiator, receiving the phase difference digital signal, the digital differentiator executing a digital difference operation on a digital signal having the second phase difference between the data edge signal and the feedback-clock-edge signal and a digital signal having the first phase difference between a previous data edge signal and a previous feedback-clock-edge signal, and correspondingly outputting a frequency information digital signal;
   a comparator, connected to the digital differentiator, the comparator executing a comparison operation according to the frequency information digital signal received, wherein when a result of the comparison operation executed by the comparator is larger than zero, the comparator outputs a frequency counting digital signal with a frequency-up command, and when the result of the comparison operation is smaller than zero, the comparator outputs the frequency counting digital signal with a frequency-down command; and a counter, receiving the frequency counting digital signal and accordingly counting and outputting the frequency adjusting digital signal, wherein the edge selector, the digital differentiator, the comparator, and the counter further receive the frequency tracking signal.

5. The frequency tracking circuit according to claim 4, wherein when the frequency tracking signal is a high level voltage, and the edge selector, the digital differentiator, the comparator, and the counter execute a frequency tracing work, and after the frequency tracking signal experiencing enabling duration of high level voltage twice in a row, the digital controlled oscillator adjusts the frequency of the feedback clock signal.

6. The frequency tracking circuit according to claim 4, wherein the digital differentiator comprises:
   a D type flip-flop, having a data input end receiving the phase difference digital signal, and a clock input end receiving the frequency tracking signal; and
   a digital operator, connected to the data input end and a data output end of the D-type flip-flop, wherein the digital operator takes the phase difference digital signal minus a previous phase difference digital signal, and outputs the frequency information digital signal.

7. The frequency tracking circuit according to claim 4, wherein the time-digital converter comprises:
   M first delay units, connected to each other in series, wherein each of the first delay units has a first delay time, and the $X^{th}$ of the M first delay units receives the feedback-clock-edge signal which has been delayed for X−1 times of the first delay time, and outputs the feedback-clock-edge signal which has been delayed for X times of the first delay time, wherein X is positive integer between 1 to M;
   M second delay units, connected to each other in series, wherein each of the second delay units has a second delay time, and the $Y^{th}$ of the M second delay units receives the data edge signal which has been delayed for Y−1 times of the second delay time, and outputs the data edge signal which has been delayed for Y times of the second delay time, wherein Y is positive integer between 1 to M;
   a NAND gate, receiving the feedback-clock-edge signal which has been delayed for M times of the first delay time and the data edge signal which has been delayed for M times of the second delay time, and outputting the frequency tracking signal;
   M time amplifiers, wherein the $Z^{th}$ of the M time amplifiers is correspondingly connected to an output end of the $Z^{th}$ of the M first delay units and an output end of the $Z^{th}$ of the M second delay units, and the time amplifiers amplify the phase difference between the data edge signal delayed and the feedback-clock-edge signal delayed, and output a phase leading digital signal, wherein Z is positive integer between 1 to M;
   M D type flip-flops, each clock input end of the M D type flip-flops receives the frequency tracking signal, and the $W^{th}$ of the M D-type flip-flops receives the phase leading digital signal of the $W^{th}$ of the M time amplifiers, wherein W is positive integer between 1 to M ; and
   an encoder, connected to the M D-type lip-flops, the encoder receiving the phase leading digital signal transmitted by the M D-type flip-flops, and proceeding a coding to form the phase difference digital signal,
   wherein the second delay time is longer than the first delay time, and M is an integer.

8. The frequency tracking circuit according to claim 7, wherein the M D type flip-flops and the encoder further receive the frequency tracking signal.

9. The frequency tracking circuit according to claim 7, wherein when the phase of the data edge signal leads the phase of the feedback-clock-edge signal, then a digital logic of the phase leading digital signal is "one", and when the phase of the data edge signal lags the phase of the feedback-clock-edge signal, then the digital logic of the phase leading digital signal is "zero."

10. The frequency tracking circuit according to claim 1, wherein the edge selector comprises:
    a first D-type flip-flop, having a data input end receiving the frequency tracking signal, a clock input end receiving the data signal, and an output end outputting the data edge signal; and
    a second D-type flip-flop, having a data input end receiving the data edge signal, a clock input end receiving the feedback clock signal, and an output end outputting the feedback-clock-edge signal.

11. A frequency tracking method for a clock and data recovery circuit, the clock and data recovery circuit including a frequency tracking circuit, the frequency tracking circuit including an edge selector, a phase-frequency processor, and a digital controlled oscillator, wherein the phase-frequency processor is connected to the edge selector, and the digital controlled oscillator is connected to the edge selector, the frequency tracking method including:
    receiving, by the edge selector, a data signal and a feedback clock signal, and sequentially outputting a data edge signal and a feedback-clock-edge signal;
    receiving, by the phase-frequency processor, the data edge signal and the feedback-clock-edge signal, and outputting a frequency adjusting digital signal after a differential operation according to a first phase difference and a second phase difference; and
    adjusting, by the digital controlled oscillator, a frequency of the feedback clock signal outputted according to the frequency adjusting digital signal,
    wherein the phase-frequency processor outputs a frequency tracking signal to the edge selector, the edge selector utilizing the frequency tracking signal for acquiring the data edge signal and utilizing the data edge signal for acquiring the feedback-clock-edge signal.

12. The frequency tracking method according to claim 11, wherein a phase of the data edge signal leads a phase of the feedback-clock-edge signal.

13. The frequency tracking method according to claim 11, wherein outputting the frequency adjusting digital signal comprises
    converting, by a time-digital converter, a phase difference between the data edge signal and the feedback-clock-edge signal into a phase difference digital signal;
    receiving, by a digital differentiator, the phase difference digital signal, executing a digital difference operation on a digital signal having the second phase difference between the data edge signal and the feedback-clock-edge signal and a digital signal having the first phase difference between a previous data edge signal and a previous feedback-clock-edge signal, and correspondingly outputting a frequency information digital signal;
    executing, by a comparator, a comparison operation according to the frequency information digital signal, wherein when a result of the comparison operation is larger than zero, outputting a frequency counting digital signal with a frequency-up command, and when the result of the comparison operation is smaller than zero, outputting the frequency counting digital signal with a frequency-down command;

receiving, by a counter, the frequency counting digital signal and accordingly counting and outputting the frequency adjusting digital signal; and receiving, by the edge selector, the digital differentiator, the comparator, and the counter, the frequency tracking signal.

14. The frequency tracking method according to claim 13, wherein when the frequency tracking signal is a high level voltage, executing a frequency tracing work by and the edge selector, the digital differentiator, the comparator, and the counter, and after the frequency tracking signal experiencing enabling duration of high level voltage twice in a row, adjusting the frequency of the feedback clock signal by the digital controlled oscillator.

15. The frequency tracking method according to claim 13, wherein receiving the phase difference digital signal comprises:

receiving, by a D type flip-flop, the phase difference digital signal, and receiving the frequency tracking signal; and taking, by a digital operator, the phase difference digital signal minus a previous phase difference digital signal, and outputting the frequency information digital signal.

16. The frequency tracking method according to claim 13, wherein receiving the phase difference between the data edge signal and the feedback-clock-edge signal comprises:

receiving, by the $X^{th}$ of M first delay units, connected to each other in series, wherein each of the first delay units has a first delay time, the feedback-clock-edge signal which has been delayed for X−1 times of the first delay time, and outputting the feedback-clock-edge signal which has been delayed for X times of the first delay time, wherein X is positive integer between 1 to M;

receiving, by the $Y^{th}$ of M second delay units, connected to each other in series, wherein each of the second delay units has a second delay time, the data edge signal which has been delayed for Y−1 times of the second delay time, and outputting the data edge signal which has been delayed for Y times of the second delay time, wherein Y is positive integer between 1 to M;

receiving, by a NAND gate, the feedback-clock-edge signal which has been delayed for M times of the first delay time and the data edge signal which has been delayed for M times of the second delay time, and outputing the frequency tracking signal;

amplifying, by M time amplifiers, wherein the $Z^{th}$ of the M time amplifiers corresponding to the $Z^{th}$ of the M first delay units and the $Z^{th}$ the M second delay units, the phase difference between the data edge signal delayed and the feedback-clock-edge signal delayed, and outputting a phase leading digital signal, wherein Z is positive integer between 1 to M;

receiving, by M D type flip-flops, each clock input of the M D-type flip-flops receives the frequency tracking signal, wherein the $W^{th}$ of the M D-type flip-flops receives the phase leading digital signal of the $W^{th}$ of the M time amplifiers, wherein W is positive integer between 1 to M; and receiving, by an encoder, the phase leading digital signal transmitted by the M D-type flip-flops, and proceeding a coding to form the phase difference digital signal, wherein the second delay time is longer than the first delay time, and M is an integer.

17. The frequency tracking method according to claim 16, further comprising receiving the frequency tracking signal by M D-type flip-flops and the encoder.

18. The frequency tracking method according to claim 16, wherein when the phase of the data edge signal leads the phase of the feedback-clock-edge signal, then a digital logic of the phase leading digital signal is "one", and when the phase of the data edge signal lags the phase of the feedback-clock-edge signal, then the digital logic of the phase leading digital signal is "zero."

19. The frequency tracking method according to claim 11, wherein receiving the data and the feedback clock signal comprises:

receiving, by a first D-type flip-flop, the frequency tracking signal, receiving the data signal, and outputting the data edge signal; and receiving, by a second D-type flip-flop, the data edge signal, receiving the feedback clock signal, and outputting the feedback-clock-edge signal.

20. The frequency tracking method according to claim 11, wherein the first phase difference is a phase difference between a previous data edge signal and a previous feedback-clock-edge signal, and the second phase difference is a phase difference between the data edge signal and the feedback-clock-edge signal.

* * * * *